Figure 1:
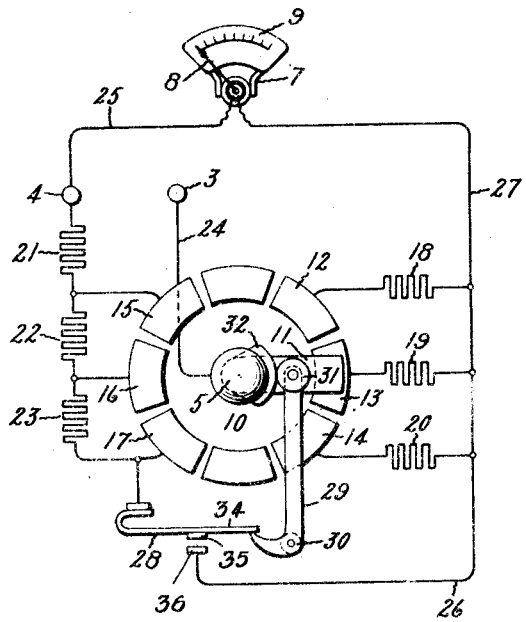

A. J. R. FIEGO.
ELECTRICAL MEASURING INSTRUMENT.
APPLICATION FILED JULY 9, 1913.

1,132,322.

Patented Mar. 16, 1915.

WITNESSES:
J. Earl Ryan
J. Ellis Glen

INVENTOR:
ALEXANDER J. R. FIEGO.
BY Albert H. Davis
HIS ATTORNEY.

UNITED STATES PATENT OFFICE.

ALEXANDER J. R. FIEGO, OF LYNN, MASSACHUSETTS, ASSIGNOR TO GENERAL ELECTRIC COMPANY, A CORPORATION OF NEW YORK.

ELECTRICAL MEASURING INSTRUMENT.

1,132,322.  Specification of Letters Patent.  Patented Mar. 16, 1915.

Application filed July 9, 1913. Serial No. 778,061.

*To all whom it may concern:*

Be it known that I, ALEXANDER J. R. FIEGO, a citizen of the United States, residing at Lynn, county of Essex, State of Massachusetts, have invented certain new and useful Improvements in Electrical Measuring Instruments, of which the following is a specification.

My invention relates to measuring instruments and particularly to an instrument adapted to be used either as a voltmeter or an ammeter.

As is well known the current-responsive element in the galvanometer type of voltmeter and ammeter is the same the only essential difference between the two instruments being in the resistance of the instruments. In a voltmeter a high resistance is placed in series with the galvanometer and the instrument is connected across the circuit and is calibrated to read volts. In an ammeter the galvanometer is connected in shunt to a low resistance and the combination is connected in series in the circuit, the deflection of the galvanometer being proportional to the drop in potential across the low resistance which in turn is proportional to the current flowing. The scale of the ammeter is graduated to read amperes directly. By using resistances of different values in either a voltmeter or an ammeter different ranges of voltage and amperage can be obtained as is well understood.

It has heretofore been proposed to adapt a single instrument for use either as a voltmeter or an ammeter by providing a plurality of resistances properly connected to the current responsive element and to separate binding posts on the base of the instrument whereby by connecting to certain of the posts the instrument would be arranged as a voltmeter while by changing the connections to other of the binding posts the instrument would be arranged as an ammeter. This construction is objectionable in that it requires that there be numerous binding posts on the base of the instrument which tend to be confusing in making connections and further where such binding posts are arranged close together it is often difficult to reach the same for making connections.

One of the objects of my invention is to provide a combined voltmeter and ammeter having a single pair of line terminals or binding posts and which is provided with a switch, the operating means of which may be adjacent the line terminals for changing the instrument from a voltmeter to an ammeter or vice versa.

A further object of my invention is to provide such an instrument which is adapted to read different ranges both as a voltmeter and an ammeter by shifting the switch to different positions.

It has been found in actual practice that it is impossible to construct a multiple contact switch such as is referred to above which will have a constant resistance. A slight variation in the resistance of the switch when using the instrument as a voltmeter would not materially affect the accuracy of the reading of the instrument since the switch is then in series with a very high resistance. When the instrument is being used as an ammeter however this slight variation in the resistance of the switch would introduce serious errors in the ammeter readings if such switch were in either of the parallel circuits of the ammeter, *i. e.* the galvanometer shunt or the resistance across which the drop in potential is read.

A still further object of my invention is therefore to so arrange the wiring of my instrument that these slight variations in the resistance of the switch will not affect the same when being used as an ammeter.

Figure 2:
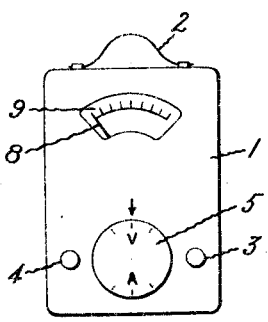

Referring to the drawings, Figure 1 is a diagrammatic view showing the wiring arrangement of my improved instrument. Fig. 2 is a front view of the instrument inclosed in a suitable casing.

The mechanism of my instrument, which is particularly designed for use as a portable instrument, is inclosed in a suitable casing 1 having a handle 2 for use in carrying the same.

3 and 4 are the single set of binding posts which appear on the exterior of the casing and adjacent to which is shown the operating head 5 of the switch used for changing the instrument from a voltmeter to an ammeter and vice versa, and for obtaining different ranges in the reading of the same both as a voltmeter and an ammeter. The current responsive element 7 which may be of the ordinary D'Arsonval type of galvanometer carries the pointer 8 which plays over the scale 9 as is usual in this type of instrument. In actual practice two scales are used, one for reading volts and the other for reading amperes.

10 designates my switch as a whole the same comprising a contact arm 11 suitably pivoted and adapted to engage with contact plates 12 to 17. Three high resistance coils 18, 19 and 20 are connected on one side to the contact plates 12, 13 and 14 respectively, and upon the other side by conductor 27 to the galvanometer 7. Three low resistance coils 21, 22 and 23 are connected in series with each other and to contacts 15, 16 and 17, respectively, as shown in Fig. 1. The binding post 3 is connected by conductor 24 to contact arm 11. Binding post 4 is connected to the low resistance windings 21, 22 and 23 and also by conductor 25 to the galvanometer. Extending from the low resistance coils 21, 22 and 23 to the galvanometer is the shunt connection 26, 27 in which is arranged a switch 28 controlled by switch 10. This switch 28 may be of any suitable design providing it gives a constant resistance when closed and I have shown as one form a switch comprising a spring 34 carrying contact 35 which coöperates with fixed contact 36; such a structure I have found to give a nonveriable resistance. In the present instance I have shown the switch 28 as being controlled by switch 10 through a bell crank lever 29 pivoted at 30 and having a friction roller 31 which coöperates with a cam 32 moving in conjunction with contact arm 11. This cam is so arranged that the switch 28 is held open so long as the contact arm 11 engages with contact plates 12, 13 and 14, while the switch is permitted to close when the contact arm 11 engages contacts 15, 16 and 17.

The operation of my instrument may be described as follows: With the contact arm 11 in engagement with contact 12, 13 or 14, it will be seen that one of the high resistance windings 18, 19 or 20 will be connected in series with the galvanometer 7 and the switch 28 will be held open. The circuit through the instrument will then be as follows: binding post 3, conductor 24, switch arm 11, contact 12, 13 or 14, resistance 18, 19 or 20, conductor 27, galvanometer 7, conductor 25 to binding post 4. As is well understood in the art the instrument under these circumstances is adapted to read as a voltmeter, binding posts 3 and 4 being connected directly across the line. When it is desired to use the instrument as an ammeter contact arm 11 is shifted to engage with one of the contacts 15, 16, or 17. Considering for instance that the contact arm 11 is in engagement with contact 15, the low resistance 21 will be connected directly to the binding posts 3 and 4. This circuit is as follows: binding post 3, conductor 24, contact arm 11, contact 15, resistance 21, binding post 4. When the contact arm 11 is shifted into engagement with contact 15 the switch 28 will be permitted to close as before explained. This closes a second circuit in shunt to the resistance 21 and including the galvanometer 7, as follows: binding post 3, conductor 24, contact arm 11, resistances 22, 23, switch 28, conductors 26, 27, galvanometer 7, conductor 25, binding post 4. From this it will be clear that binding posts 3 and 4 may be connected into a circuit and the instrument used as an ammeter, in the instance described the drop potential being read across resistance 21.

It will be noted that when using the instrument as an ammeter the switch 10 is in series with both of the shunt circuits, the drop in potential being read directly across the low resistances. As before stated the internal switch 28 which is in the galvanometer shunt can be constructed to give a practically constant resistance.

In the instrument illustrated in the drawing, I have shown the same as arranged to give three different ranges both as a voltmeter and an ammeter, and on the face of the casing 1 and on the operating head 5 suitable indicia are placed to indicate the proper position for the switch 10 in order to give the range desired. It will be understood of course that I am not limited to this specific number of ranges but that I may have either a greater or a lesser number as found desirable. It will be further evident that I need not arrange my resistances 21, 22 and 23 in series as shown but that I may associate each resistance separately with its contact.

What I claim as new and desire to secure by Letters Patent of the United States, is:—

1. A measuring instrument comprising an element responsive to current flow, a pair of circuit terminals, a switch, a plurality of resistances, means controlled by said switch for connecting any one of said resistances to said terminals in series with said element, a second plurality of resistances, and means controlled by said switch for connecting one or more of said second resistances to said terminals in shunt to said element.

2. A measuring instrument comprising an element responsive to current flow, a pair of circuit terminals, a plurality of resistances, a second plurality of resistances, means including a switch adapted to connect any one of said first named resistances to said circuit terminals in series with said current responsive element, means including said switch for connecting one or more of said second named resistances to said circuit terminals and in shunt to said current responsive element and a switch in said shunt connection controlled by said first named switch.

3. A measuring instrument comprising an element responsive to current flow, a pair of circuit terminals, two sets of contacts, a switch arm adapted to engage with the contacts of each set, a resistance associated with each contact of one of said sets, circuit connections for connecting the respective resistances to said circuit terminals in series with said current responsive element when said switch arm engages with the contacts of said one set; a resistance associated with each contact of the other of said sets, circuit connections for connecting the respective resistances last mentioned to said circuit terminals when the switch arm engages with the contacts of said other set, and means for connecting said current responsive element to said circuit terminals when the switch engages with said other set of terminals said means including a switch which is closed and opened by the movement of said switch arm into and out of engagement with the last mentioned set of contacts.

In witness whereof, I have hereunto set my hand this seventh day of July, 1913.

ALEXANDER J. R. FIEGO.

Witnesses:
JOHN A. McMANUS, Jr.,
HENRY A. ANDERSEN.